(12) United States Patent
Cross

(10) Patent No.: US 6,209,941 B1
(45) Date of Patent: Apr. 3, 2001

(54) ALL-TERRAIN VEHICLE RACK UTILITY BOX

(75) Inventor: Gary Cross, Estherville, IA (US)

(73) Assignee: Cycle Country Accessories, Milford, IA (US)

( * ) Notice: Subject to any disclaimer, the term of this patent is extended or adjusted under 35 U.S.C. 154(b) by 0 days.

(21) Appl. No.: 09/226,752

(22) Filed: Jan. 6, 1999

(51) Int. Cl.[7] ........................................ B60R 5/00
(52) U.S. Cl. .................. 296/37.1; 224/426; 224/488; 224/572
(58) Field of Search ..................... 296/3, 37.1; 224/274, 224/401, 402, 403, 408, 413, 412, 425, 426, 441, 447, 490, 488, 519, 42.32, 539, 547, 564, 566, 572

(56) References Cited

U.S. PATENT DOCUMENTS

| | | | |
|---|---|---|---|
| 4,844,309 | * | 7/1989 | Aubin et al. .................. 224/401 |
| 5,360,259 | * | 11/1994 | Lemberger .................. 224/401 X |
| 5,573,162 | * | 11/1996 | Spencer et al. .................. 224/401 |

* cited by examiner

*Primary Examiner*—D. Glenn Dayoan
*Assistant Examiner*—Jason Morrow
(74) *Attorney, Agent, or Firm*—Zarley, McKee, Thomte, Voorhees & Sease; Dennis L. Thomte

(57) ABSTRACT

A utility box is disclosed for use with an all-terrain vehicle with the utility box being supported on the support rack at the rearward end of the vehicle. The storage box has a pair of posts protruding outwardly from the opposite sides thereof and has a pair of bungee cords secured thereto which are extended through the support rack and over the posts to maintain the utility box on the vehicle. A cover is also pivotally secured to the box for closing the open upper end thereof.

9 Claims, 5 Drawing Sheets

ALL-TERRAIN VEHICLE RACK UTILITY BOX

BACKGROUND OF THE INVENTION

1. Field of the Invention

This invention relates to an all-terrain vehicle rack utility box and more particularly to an all-terrain vehicle rack utility box including novel means for securing the same to the rack and also having the ability to be mounted on a variety of different racks.

2. Description of the Related Art

A conventional all-terrain vehicle (ATV) normally has a rack at the rearward end thereof which is either a horizontally disposed plastic or fiberglass shelf-like member or one which is constructed of welded tubular members having an upstanding rear end portion. Usually, when a box or other storage container is to be mounted on the rack, bungee cords or the like are connected to opposite sides of the rack and extended over the box which is not only inconvenient, but which sometimes interferes with the use of the box such as the placement of items within the box or the removal of items from the box. Additionally, due to the upstanding rear end portion on the rack, storage boxes having a length greater than the distance from the rear of the driver's seat to the upstanding rear end portion of the tubular rack are not conveniently accommodated.

SUMMARY OF THE INVENTION

A utility box is described for use with an all-terrain vehicle having a substantially horizontally disposed support rack at the rearward end thereof. The utility box is supported on and is secured to the support rack. The utility box includes opposite side walls which have a pair of spaced-apart posts extending outwardly therefrom. A pair of bungee cords are secured to opposite sides of the utility box and are extended through the support rack and over the posts on the box to maintain the box on the support rack. A cover is pivotally secured to the box for closing the open upper ends thereof. The lower forward ends of the cover have openings formed therein which receive the forwardmost posts on the sides of the box.

A principal object of the invention is to provide a utility box for use with an all-terrain vehicle.

Still another object of the invention is to provide a utility box for use with an all-terrain vehicle wherein means is provided for conveniently securing the box to the support rack at the rearward end of the vehicle.

Still another object of the invention is to provide a utility box which may be supported on a substantially horizontally disposed support rack or a tubular support rack located at the rearward end of the all-terrain vehicle.

Yet another object of the invention is to provide a utility box of the type described having a novel removable cover associated therewith.

Still another object of the invention is to provide a utility box for an all-terrain vehicle including means for securing the same to the support rack on the vehicle with that means not interfering with the normal use of the box.

Yet another object of the invention is to provide a utility box of the type described which may be positioned on and secured to various types and sizes of support racks.

These and other objects will be apparent to those skilled in the art.

DESCRIPTION OF THE PREFERRED EMBODIMENT

Figure 4:
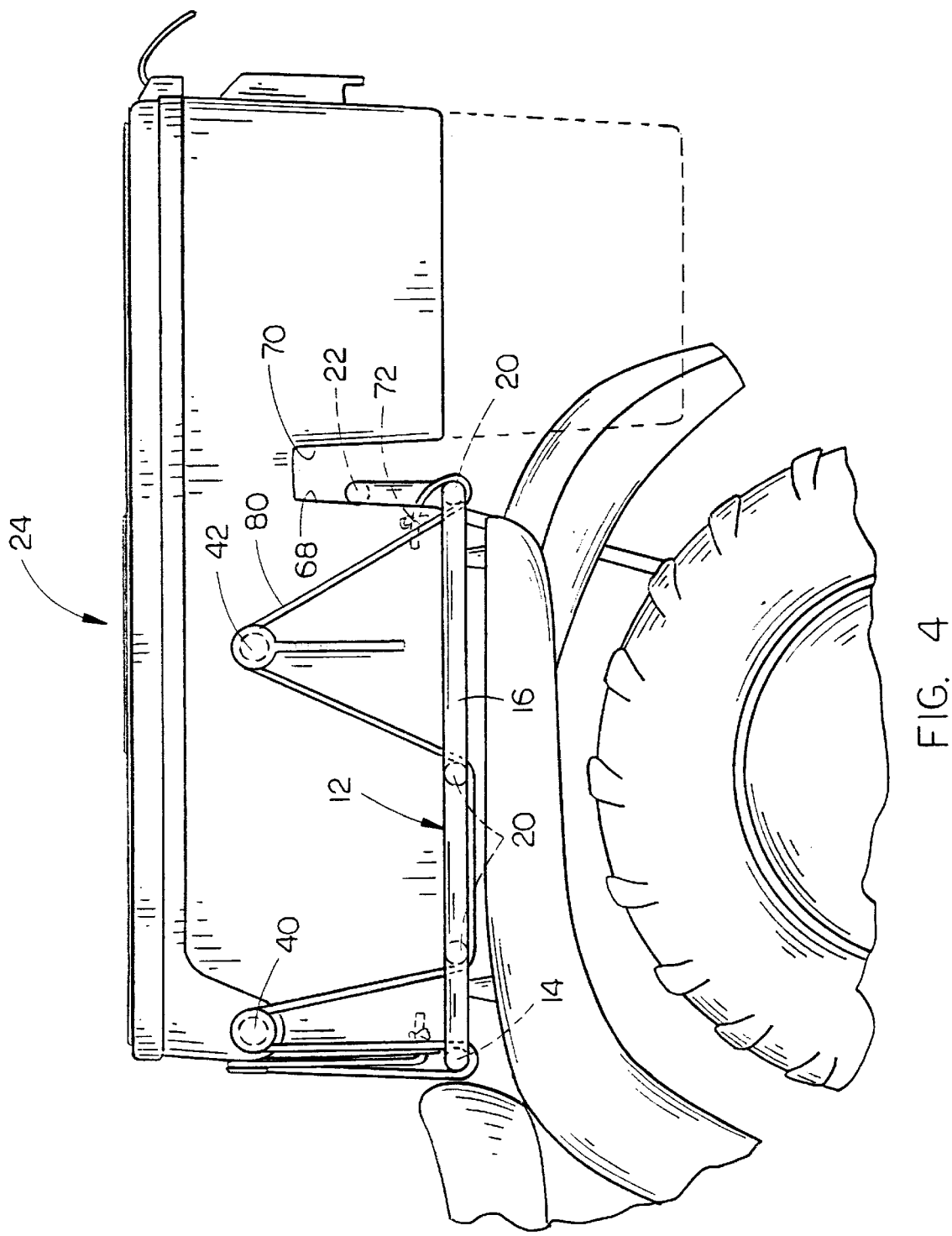
FIG. 4 is a side elevational view of the utility box of this invention mounted on the rack of an all-terrain vehicle with the broken lines at the rear end of the box depicting a modified form of the box.

The numeral 10 refers generally to a conventional all-terrain vehicle (ATV) including a support rack 12 at the rearward end thereof. In most cases, support rack 12 is comprised of a framework of tubular members welded together, but in some cases may simply comprise a substantially flat metal, plastic or fiberglass deck. The invention to be described herein is particularly well-suited for use with the tubular style support rack illustrated in the drawings, but may also be used with the deck-type racks. For purposes of description, support rack 12 will be described as including a forward, transversely extending tubular member 14, a pair of longitudinally extending side tubular members 16, transversely extending tubular members 20 which extend between tubular members 16, and rearward tubular member 22 having an upper end portion which is positioned above tubular members 20, as seen in FIG. 4.

The utility box of this invention is referred to generally by the reference numeral 24 which preferably is closed by a cover 26, although the box 24 may be used without a cover if so desired. Box 24 includes a bottom wall 28, side walls 30 and 32, front wall 34 and rear wall 36. An upwardly extending indentation or channel 38 is preferably formed in the bottom wall 28 and side walls 30 and 32 to receive the rearward tubular member 22 of support rack 12 therein. Preferably, the indentation 38 has a dimension such that the box 24 may be installed on all models of ATV's regardless of whether the rearward tubular member 32 is disposed one inch or four inches above the remainder of the support rack.

At least one knob-like post, peg or protrusion and preferably two knob-like posts extend outwardly from each of side walls 30 and 32. For purposes of description, the box 24 of this invention will be described as having two posts extending outwardly from each of the side walls 30 and 32, although any number of those posts could be used.

Figure 1:
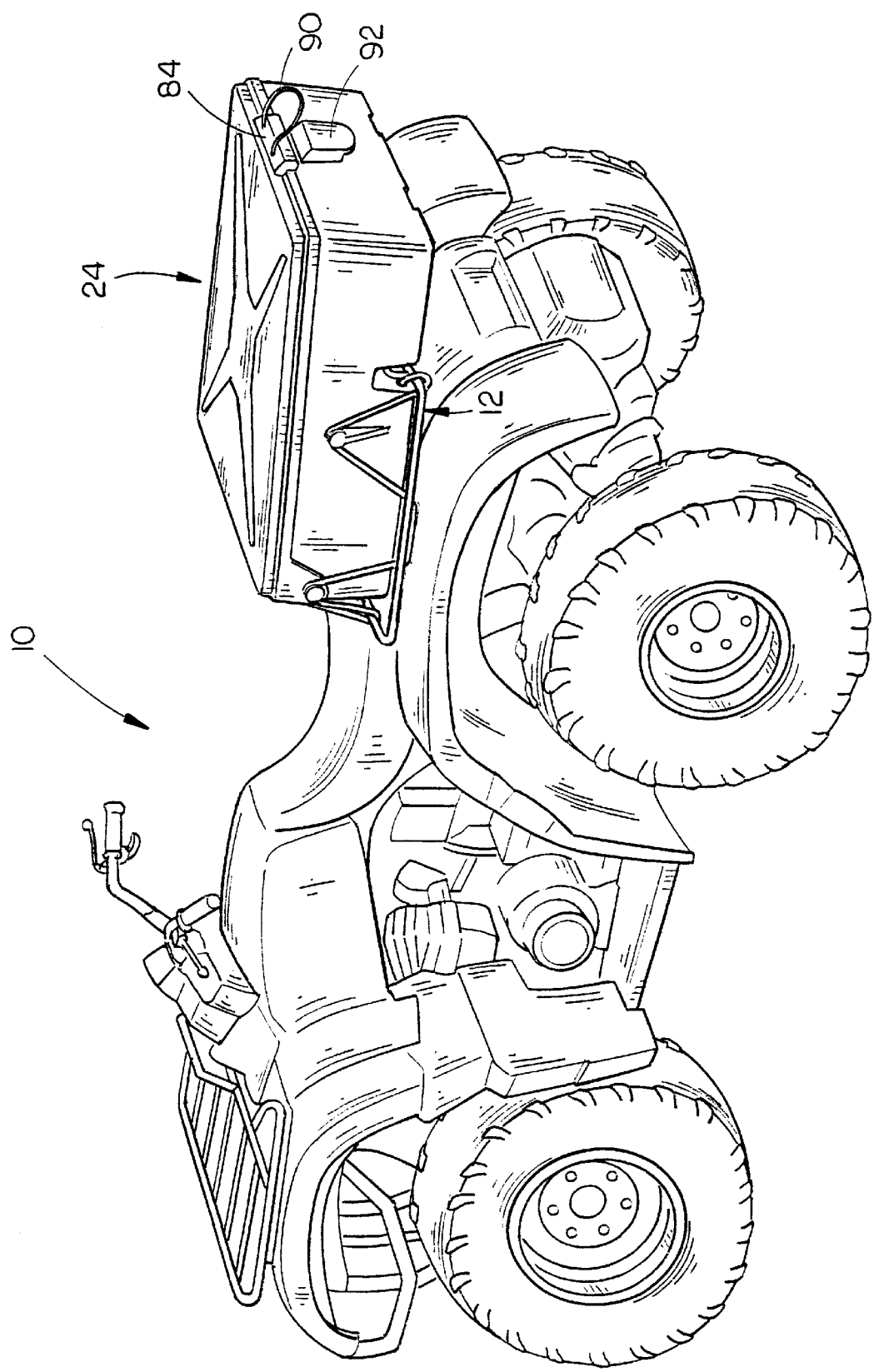
FIG. 1 is a rear perspective view of the utility box of this invention mounted on the rack of an all-terrain vehicle.
Figure 2:
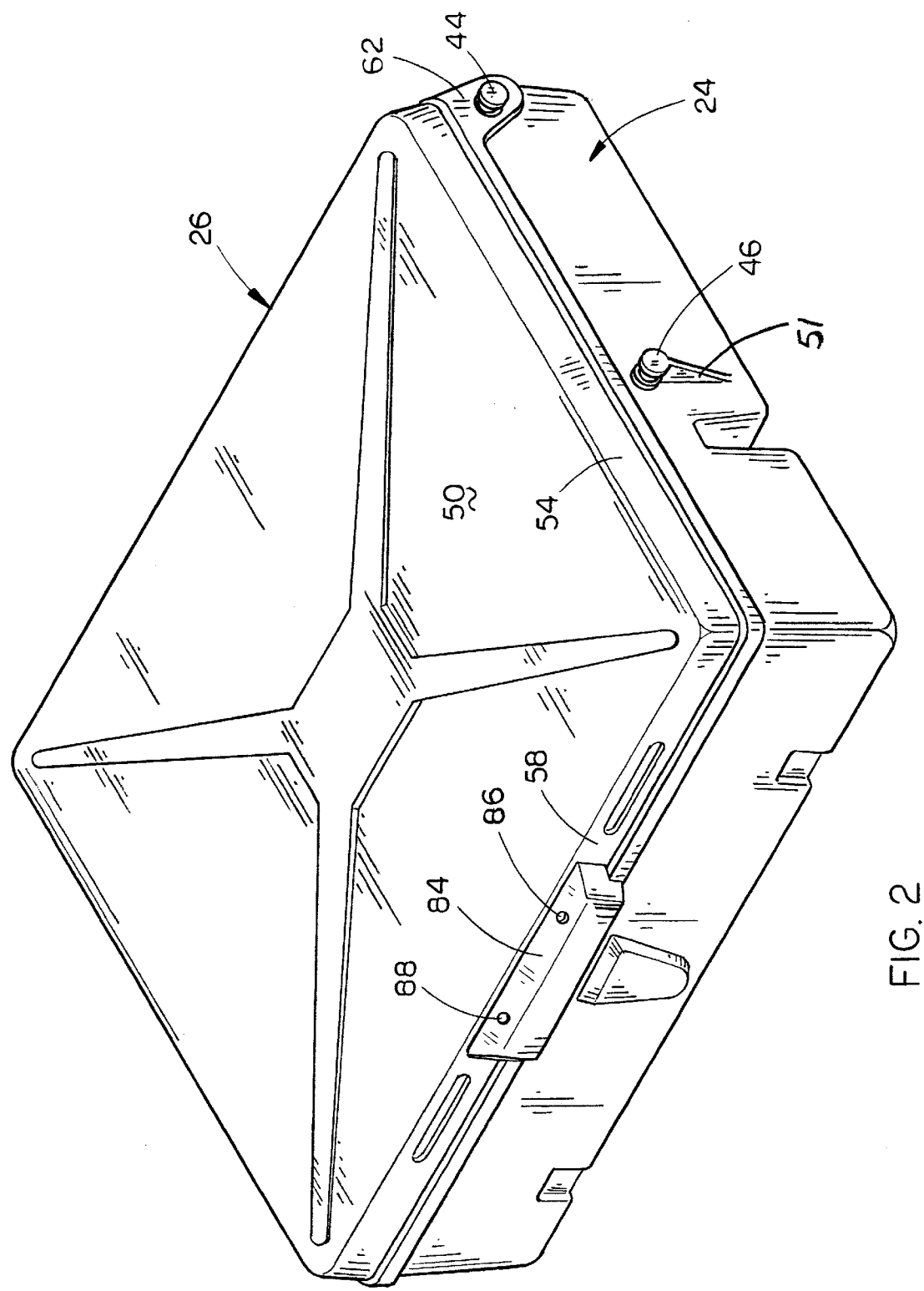
FIG. 2 is a rear perspective view of the utility box.
Figure 3:
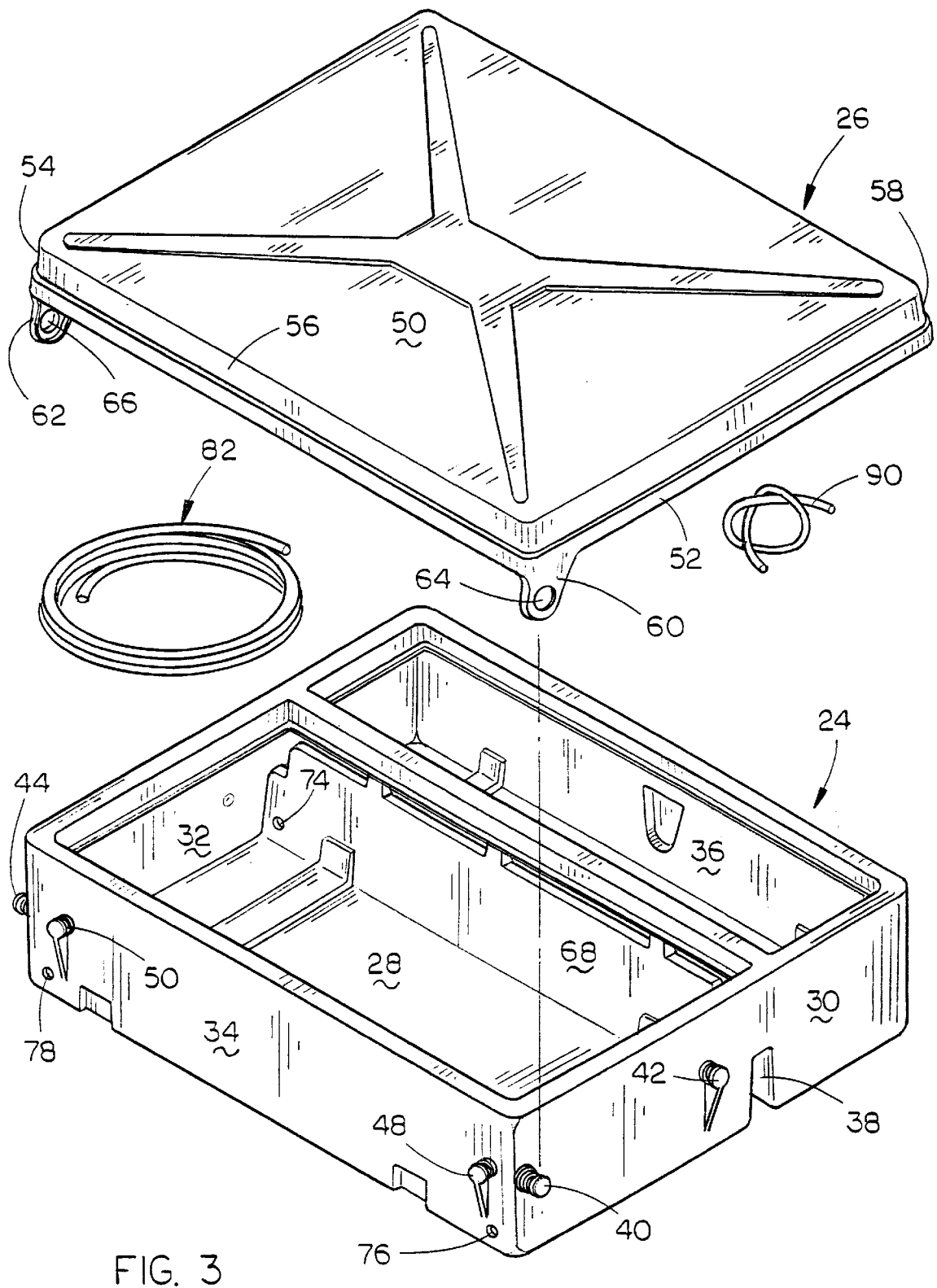
FIG. 3 is a front exploded perspective view of the utility box.

Thus, a pair of spaced-apart, knob-like posts 40 and 42 extend outwardly from side wall 30, as seen in FIG. 3. A pair of spaced-apart, knob-like posts 44 and 46 extend outwardly from side wall 32, as seen in FIG. 2, with post 40 being positioned at the upper forward end of side wall 30 and post 42 being spaced rearwardly therefrom. Post 44 is positioned at the upper forward end of side wall 32 with post 46 being spaced rearwardly therefrom. It is also preferred that a pair of spaced-apart, knob-like posts 48 and 50 be provided on front wall 34. It is preferred that each of the posts 40, 42, 44, 46, 48 and 50 be provided with a gusset plate 51 extending between the post and the adjacent wall to prevent the post from being deflected downwardly when a bungee cord is extended therearound.

As stated, the box 24 of this invention also preferably includes a cover 26. Cover 26 includes a top wall 50, side walls 52 and 54, front wall 56 and rear wall 58. The lower forward ends of side walls 52 and 54 are provided with ear portions 60 and 62, respectively, which have hinge openings 64 and 66 formed therein, respectively, which are adapted to receive the posts 40 and 44 therein, respectively, to provide a pivotal connection between the cover 26 and the box 24. The cover 26 and box 24 are preferably constructed of a plastic material. The flexibility of the ear portions 60 and 62 enables the ear portions 60 and 62 to be deflected outwardly with respect to the posts 40 and 44 to enable the cover 26 to be removed from the box 24 as desired for shipping purposes or in those instances when a cover 26 is not needed or is not required.

Indentation 38 defines walls 68 and 70, as illustrated in FIG. 4. The outer ends of wall 68 have openings 72 and 74 formed therein while the outer ends of front wall 34 have openings 76 and 78 formed therein. The numerals 80 and 82 refer to bungee cords which are used in association with the box 24 to secure the box 24 to the rack 12. The rearward end of bungee cord 80 is extended upwardly through the indentation 38 and is extended through the opening 72 formed in wall 68. The rearward end of the bungee cord 80 is knotted, as illustrated in FIG. 4, to prevent the bungee cord 80 from pulling outwardly through the opening 72. The forward end of the bungee cord 80 is extended rearwardly through the opening 76 and is also knotted, as illustrated in FIG. 4, so that the forward end of the bungee cord 80 will not pull outwardly through the opening 76. The length of the bungee cord 80 may be effectively changed by simply pulling more of the bungee cord 80 inwardly through one of the openings 72 or 76 and re-knotting the same. When the box 10 is positioned on the rack 12, as illustrated in FIG. 4, a portion or loop of the bungee cord is pulled upwardly between a pair of the frame members 20 and is positioned over post 42, as illustrated in FIG. 4. A portion or loop of the bungee cord 80 is also pulled upwardly between frame members 14 and 20, as illustrated in FIG. 4, and is looped over the post 40. The bungee cord 80 may also be extended around post 48 if desired. The engagement of the bungee cord 80 with the posts 42 and 40 positively secure the box 10 to one side of the rack. The ends of the bungee cord 82 are extended through the openings 78 and 74 and are also knotted as described in the positioning of bungee cord 80. The bungee cord 82 is then secured over the posts 46 and 44 in a fashion similar to that described with respect to bungee cord 80 and the posts 40 and 42. Bungee cord 82 may also be extended around post 50 if desired.

Not only do the bungee cords 80 and 82 secure the box 10 to the rack 12, the positioning of the bungee cords 80 and 82 over the posts 40 and 44, respectively, also prevents the cover 26 from becoming disconnected from posts 40 and 44.

The rearward end of cover 26 is provided with a rearwardly extending protrusion 84 having a pair of openings 86 and 88 formed therein which receive the opposite ends of bungee cord 90. The loop of the bungee cord 90 is adapted to be extended beneath the lip 92 to maintain the cover 26 in its closed position.

Figure 5:
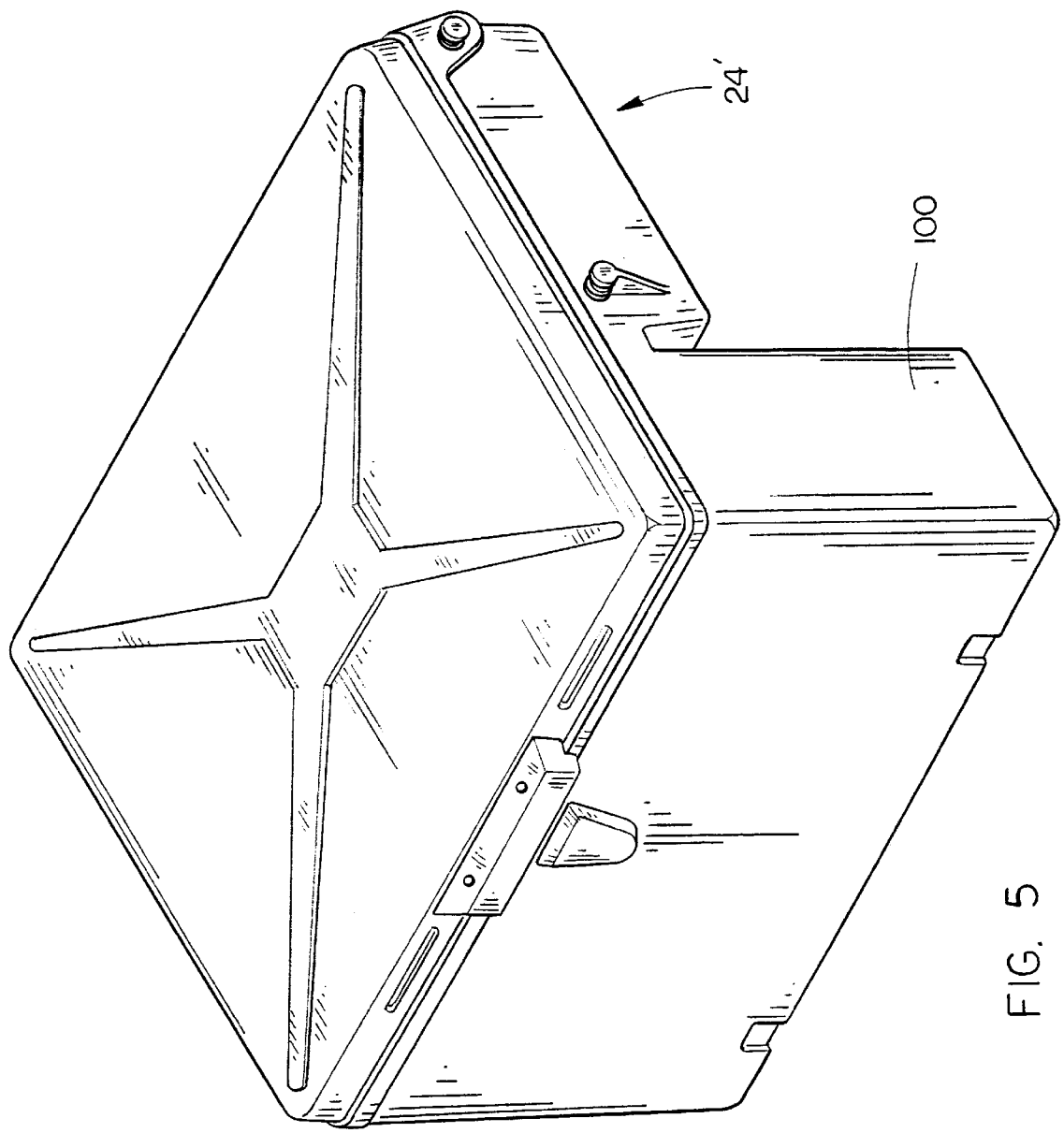
FIG. 5 is a rear perspective view of the modified form of the invention.

In FIG. 5, a modified form of the utility box of this invention is illustrated and is referred to by the reference numeral 24'. The only difference between box 24 and box 24' is that box 24' has its lower rearward end portion extending downwardly from the remainder of the box and which is referred to by the reference numeral 100.

It can therefore be seen that a novel utility box has been provided for an all-terrain vehicle which may be supported upon and secured to the support rack located at the rearward end of the all-terrain vehicle. The construction of the utility box ensures that the utility box may be supported on and secured to the tubular-type storage racks, regardless of the design of the rearward end of the storage rack due to the indentation 38 formed in the box 24. Further, it can be seen that a utility box has been provided which includes a novel means for securing a cover thereto in a removable fashion. The means of attaching the utility box to the support rack of the all-terrain vehicle not only positively secures the box to the vehicle, but does not interfere with the normal use of the box.

Although the utility box 24 is illustrated and described as being secured to a support rack at the rear of the all-terrain vehicle, the box 24 obviously could be mounted on a support rack positioned at the forward end of the all-terrain vehicle.

Thus it can be seen that the above-described invention accomplishes at least all of its stated objectives.

I claim:

1. In combination with an all-terrain vehicle including a wheeled frame having a forward end, a rearward end, and a substantially horizontally disposed support rack at the rearward end thereof, said support rack having forward and rearward ends, and opposite sides, comprising:

a utility box, having rearward and forward ends, supported on and secured to said support rack;

said utility box including a bottom having upstanding forward, rearward and opposite side walls extending upwardly therefrom to define a storage compartment;

each of said side walls having at least a pair of spaced-apart posts extending outwardly therefrom;

a cover pivotally secured to said utility box for selectively closing the same;

said cover including a top wall having rearward and forward end walls and opposite side walls extending downwardly therefrom which are positioned outwardly of the upper ends of said forward, rearward and opposite side walls of said utility box when said cover is in its closed position;

said side walls of said cover being pivotally secured to the forwardmost post on said side walls of said utility box;

a first elastic cord secured to one side of said support rack which extends around said posts on one of said side walls to secure said utility box to said support rack;

and a second elastic cord secured to the other side of said support rack which extends around said posts on the other of said side walls to secure said utility box to said support rack.

2. The combination of claim 1 wherein each of said elastic cords extends around the forwardmost post on said side walls of said utility box outwardly of said cover to maintain said cover on said utility box.

3. The combination of claim 1 wherein each of said side walls of said cover has an ear portion extending downwardly therefrom; each of said ear portions having an opening formed therein which receives the associated forwardmost post therein to provide the pivotal connection of said cover to said utility box.

4. The combination of claim 3 wherein each of said elastic cords extends around the forwardmost post on said side walls of said utility box outwardly of said ear portion of said cover to maintain said ear portions of said cover on said forwardmost posts.

5. In combination with an all-terrain vehicle including a wheeled frame having a forward end, a rearward end, and a substantially horizontally disposed support rack at the rearward end thereof, said support rack having forward and rearward ends, opposite sides, and an upstanding rear end portion, comprising:

a utility box, having rearward and forward ends, supported on and secured to said support rack;

said utility box including a bottom having upstanding forward, rearward and opposite side walls extending upwardly therefrom to define a storage compartment;

said bottom having an Indentation formed therein which receives a portion of said support rack;

each of said side walls having at least one post extending outwardly therefrom;

a first elastic cord secured to one side of said support rack which extends around said post on one of said side walls to secure said utility box to said support rack;

and a second elastic cord secured to the other side of said support rack which extends around said post on the other of said side walls to secure said utility box to said support rack.

6. In combination with an all-terrain vehicle including a wheeled frame having a forward end, a rearward end, and a substantially horizontally disposed support rack at the rearward end thereof, said support rack having forward and rearward ends, and opposite sides, comprising:

a utility box, having rearward and forward ends, supported on and secured to said support rack;

said utility box including a bottom having upstanding forward, rearward and opposite side walls extending upwardly therefrom to define a storage compartment;

each of said side walls having at least one post extending outwardly therefrom;

a first elastic cord secured to one side of said support rack which extends around said post on one of said side walls to secure said utility box to said support rack;

and a second elastic cord secured to the other side of said support rack which extends around said post on the other of said side walls to secure said utility box to said support rack;

said forward wall of said utility box having at least a pair of posts extending forwardly therefrom;

said first elastic cord extending around one of said posts on said front wall of said utility box;

said second elastic cord extending around the other of said posts on said front wall of said utility box.

7. In combination with an all-terrain vehicle including a wheeled frame having a forward end, a rearward end, and a substantially horizontally disposed support rack at the rearward end thereof, said support rack having forward and rearward ends, and opposite sides, comprising:

a utility box, having rearward and forward ends, supported on and secured to said support rack;

said utility box including a bottom having upstanding forward, rearward and opposite side walls extending upwardly therefrom to define a storage compartment;

each of said side walls having at least a pair of spaced-apart posts extending outwardly therefrom;

a first elastic cord secured to one side of said support rack which extends around said posts on one of said side walls to secure said utility box to said support rack;

and a second elastic cord secured to the other side of said support rack which extends around said posts on the other of said side walls to secure said utility box to said support rack;

each of said first and second elastic cords having opposite ends;

one end of each of said first and second elastic cords being secured to said utility box adjacent the forward end thereof;

the other end of each of said first and second elastic cords being secured to said utility box rearwardly of the connection of said one end of said first and second elastic cords to said utility box.

8. In combination with an all-terrain vehicle including a wheeled frame having a forward end, a rearward end, and a substantially horzontally disposed support rack at the rearward end thereof, said support rack having forward and rearward ends, and opposite sides, comprising:

a utility box, having rearward and forward ends, supported on and secured to said support rack;

said utility box including a bottom having upstanding forward, rearward and opposite side walls extending upwardly therefrom to define a storage compartment;

each of said side walls having at least one post extending outwardly therefrom;

each of said posts having a gusset plate associated therewith which extends between the post and the utility box wall adjacent thereto;

a first elastic cord secured to one side of said support rack which extends around said post on one of said side walls to secure said utility box to said support rack;

and a second elastic cord secured to the other side of said support rack which extends around said post on the other of said side walls to secure said utility box to said support rack.

9. The combination of claim 7 wherein said utility box has holes formed therein which receive the ends of said first and second elastic cords extending therethrough.

* * * * *